Figure 1:
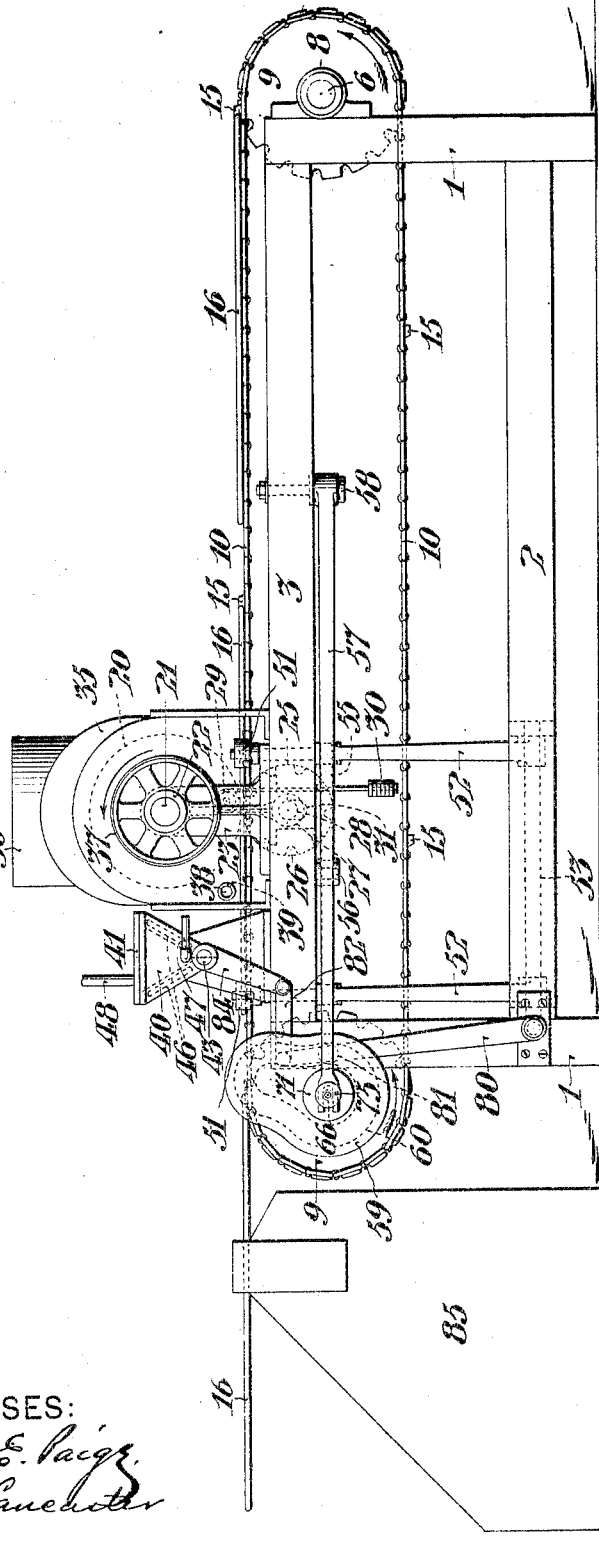

No. 784,206. PATENTED MAR. 7, 1905.
G. H. & C. H. W. CLIFF.
MACHINE FOR CLEANSING AND GREASING BAKING PANS.
APPLICATION FILED FEB. 20, 1904.

3 SHEETS—SHEET 1.

WITNESSES:
INVENTORS:
George H. Cliff
Charles H. W. Cliff
By their Attorney

No. 784,206. PATENTED MAR. 7, 1905.
G. H. & C. H. W. CLIFF.
MACHINE FOR CLEANSING AND GREASING BAKING PANS.
APPLICATION FILED FEB. 20, 1904.
3 SHEETS—SHEET 2.
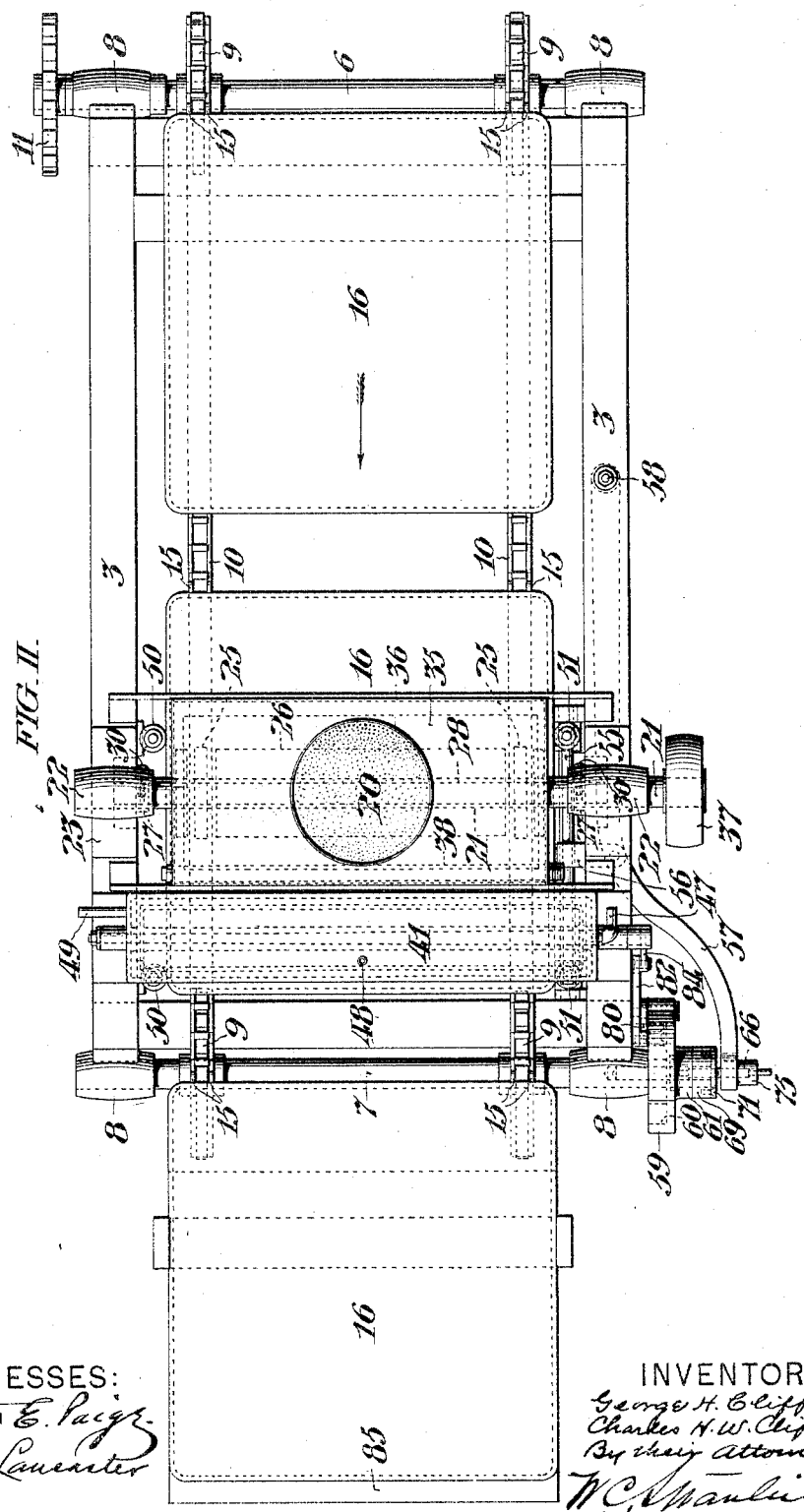
WITNESSES:
INVENTORS:

No. 784,206. PATENTED MAR. 7, 1905.
G. H. & C. H. W. CLIFF.
MACHINE FOR CLEANSING AND GREASING BAKING PANS.
APPLICATION FILED FEB. 20, 1904.
3 SHEETS—SHEET 3.
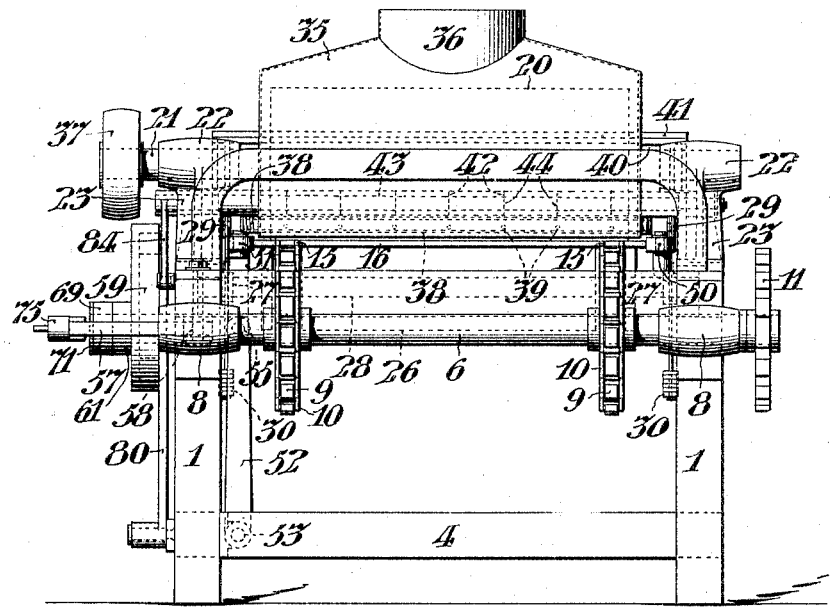
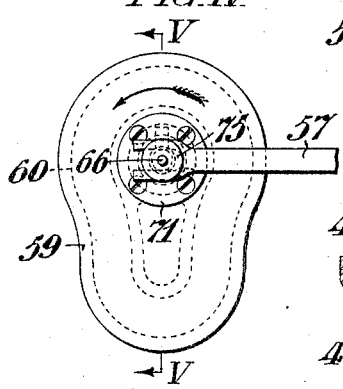
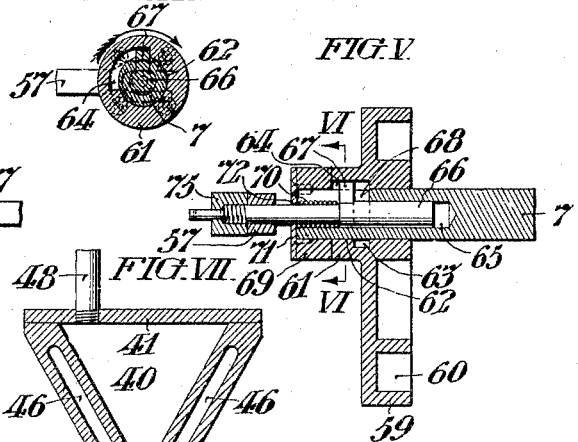
WITNESSES: INVENTORS:
George H. Cliff
Charles H. W. Cliff No. 784,206. Patented March 7, 1905.

UNITED STATES PATENT OFFICE.

GEORGE H. CLIFF AND CHARLES H. W. CLIFF, OF PHILADELPHIA, PENNSYLVANIA.

MACHINE FOR CLEANSING AND GREASING BAKING-PANS.

SPECIFICATION forming part of Letters Patent No. 784,206, dated March 7, 1905.

Application filed February 20, 1904. Serial No. 194,472.

*To all whom it may concern:*

Be it known that we, GEORGE H. CLIFF and CHARLES H. W. CLIFF, citizens of the United States, residing in the city of Philadelphia, county of Philadelphia, and State of Pennsylvania, have invented a Machine for Cleansing and Greasing Baking-Pans, of which the following is a specification.

This invention relates to a machine for cleansing and greasing baking pans, and its object is to provide means for removing bread crust, cake crust, or other undesirable substances from baking pans, after they have been used for baking purposes. A further object of the invention is to provide means for applying grease to the said pans, after they have been thoroughly cleansed by the removal therefrom of the bread or cake crust, or other undesirable substance.

The invention resides in the combination and arrangement of parts as hereinafter described in the specification, set forth specifically in the appended claims, and as illustrated in the accompanying drawings forming a part of this specification, and in which, Figure I is a side elevation of a machine embodying our invention;

Figure II is a top plan view of the same;

Figure III is an end elevation looking toward the left in Figures I and II;

Figure IV is a side elevation of a cam disk, and a portion of a lever associated therewith, the said cam disk being in a different position from that in which it is shown in Figure I;

Figure V is a section on the line V-V of Figure IV;

Figure VI is a section on the line VI-VI of Figure V;

Figure VII is a transverse section of the receptacle for the grease employed in greasing the baking pans.

Referring to the drawings, it will be noted that the machine is supported upon a frame consisting of the upright supports 1, horizontal side pieces 2 and 3, and end pieces 4. 6 and 7 designate rotatable shafts respectively located at the opposite ends of the supporting frame of the machine, the said shafts being journaled in bearings 8.

9 designates sprocket wheels, two of which are mounted on each of the shafts 6 and 7. 10 designates endless carrying sprocket chains which are in engagement with the said sprocket wheels 9. 11 designates a sprocket wheel mounted upon one end of the shaft 6. By means of the said sprocket wheel 11, rotation is imparted to the said shaft 6, which rotation is transmitted to the shaft 7 by means of the combined sprocket and carrying chains 10 which are in engagement with the sprocket wheels upon the said shafts 6 and 7. The sprocket wheel 11 is driven from any suitable source of power, not shown.

The sprocket chains are provided at intervals with lugs or projections 15, which are adapted to engage the rear edge of baking pans 16 which are adapted to rest upon and be carried forward by the said chains, as clearly indicated in Figures I and II of the drawings. As the baking pans are carried forward in the machine, they pass underneath a rotating brush 20, consisting of wire or any other suitable material, mounted upon a rotatable shaft 21, which is journaled in bearings 22, provided at the upper ends of upright standards or supports 23 secured to the side pieces 3, as clearly indicated in Figures I to III inclusive.

In order to prevent sagging of the carrying sprocket chains 10 and the baking pans 16 at points intermediate the sprocket wheels 9 on the shafts 6 and 7, we have provided toothed wheels 25, indicated by dotted lines in Figures I and II, which are adapted to and do engage the sprocket chains 10 and a pressure roller 26, also indicated in dotted lines in the said Figures I and II. The said roller 26 is located opposite to the cleansing brush 20 and pressed upwardly against the pans to hold them against the said brush. The said roller also prevents the central portion of the bottoms of the pans, which are of thin plate, from bulging out beyond the side portions thereof.

The sprocket wheel 25 and roller 26 are both carried upon a shaft 28, which is supported by and rotates in rings 27, the said rings being in turn supported by chains, ropes or cords which extend upwardly over pulleys 29 supported upon the upright standards 23, the opposite ends of said chains, ropes or cords being provided with weights 30. The opposite ends of the shaft (upon which the members 25 and 26 are supported) project into elongated slots 31 in the inner sides of the side pieces 3 of the supporting frame of the machine. The elongated slots 31 permit a limited amount of vertical movement of the said shaft. Rotation of the shaft 28 is occasioned by the conveying sprocket chains 10 engaging the sprocket wheels 25.

The rotating cleansing brush 20 is located within a box-like covering 35, the interior of which is in communication, through an exhaust pipe 36, with a suitable and effective means for exhausting the air, such exhausting means not being illustrated. Rotation is imparted to the shaft 21 and to the cleansing brush 20 located thereon, by means of a belt pulley 37, the said pulley being connected to any suitable source of power, not shown.

It will be understood that as the baking pans are carried forward, they pass between the cleansing brush 20 and the pressure roller 26, the said pressure roller and the cleansing brush both being rotated, the latter in a direction opposite to that of the movement of the baking pans, and that the said baking pans are pressed upwardly against the lower side of the rotating cleansing brush by means of the said pressure regulator.

As will be understood, rotation of the cleansing brush 20 loosens and removes particles of bread, cake or other substance from the pans. As a further means of removing the particles of bread, cake, etc., from the pans, the pipe 38 is provided which is connected with a suitable source (not shown) of air under pressure. A series of perforations 39 is provided in the pipe 38 and through these perforations the air is forced against the pans as they pass beyond the brush 20. The blast of air escaping from the perforations in the pipe 38 not only assists in cleansing the pan, but also assists in forcing such particles as are loosened from the pans from the box-like cover 35 through the exhaust pipe 36.

Before the pans are employed again for baking purposes, it is necessary to grease them, and our machine includes means for this purpose.

Referring to the means for greasing the said pans, 40 designates a receptacle or vessel for containing the grease, the said vessel being provided with a cover 41. As illustrated, the receptacle 40 is, in transverse section, of triangular outline, though, of course, the sectional contour of the receptacle may be made of any form desired.

The bottom of the said receptacle is provided with a series of small openings 42. The said openings are adapted to be opened and closed by means of a valve 43 extending from end to end of the said receptacle 40, and which is provided with a series of openings 44 which register with the openings 42 in the bottom of the said receptacle 40. In order to keep the grease in a fluid state, we have provided hollows or recesses 46 in the side and end walls of the receptacle 40 into which steam may be conducted through a pipe 47 from any suitable source, not shown, the said steam being conducted from the said hollows or recesses 46 through an outlet pipe 49.

In order to force the grease from the said receptacle 40, air under pressure is forced into the said receptacle above the grease contained therein, through a pipe 48. The source of the said air, constituting no part of this invention, is not shown.

In order that the passage of the pans through the machine may control the flow or passage of grease from the receptacle 40, we have provided a valve controlling mechanism which is adapted to occasion the turning of the valve 43 into position to open the passageways from the receptacle 40 at such times only as there may be a baking pan underneath the said receptacle, at other times the said valve being held in position to close the said passageways.

As the baking pans pass underneath the cleansing brush 20, the opposite edges thereof engage rollers 50 and 51. The rollers 50, except for a movement of rotation, are stationarily secured to one of the side pieces 3 of the supporting frame. The rollers 51 are mounted upon the upper ends of pivoted levers 52, the said levers 52 being pivoted at their lower ends to a rod 53 indicated in dotted lines in Figure I, the said rod being supported in brackets upon one of the bottom side pieces 2 of the supporting frame.

55 designates a rod or bar supported upon the pivoted levers 52, intermediate their ends, and 56 is a link connected at one end to the said rod 55 intermediate its ends, and at its other end to a lever 57 pivoted at one end 58 to one of the top side pieces 3 of the supporting frame, the other end of the said lever 57 being connected to clutch mechanism for controlling the movements of and positions of rest assumed by the cam disk 59 having a cam groove 60 of pear-shape in outline in the side thereof.

The cam disk 59 is provided with a boss 61 having an opening 62 therethrough to receive one end portion of the shaft 7. The said disk is loosely mounted upon the said shaft 7 so as to permit rotation of the shaft independently of the cam disk. Intermediate the ends of the opening 62 an annular depression or recess 63 is provided in the bounding wall of the said opening. The depression 63 is rectangular in transverse section, though it may be of any other suitable sectional contour. An elongated notch 64 is formed at one side of the depression or recess 63, as indicated in Figures V and VI.

An opening 65 is provided in the end of the shaft 7, into which a longitudinally movable rod 66 projects or extends, the said rod being provided with a projecting lug 67 which projects through a slot 68 in the end portion of the shaft 7 beyond the peripheral surface of the shaft. The end of the said projection normally is in alinement with and is adapted to rotate in the depression or recess 63.

The said rod 66 is held in its extreme inner position, such extreme position being that in which the projecting lug 67 is in alinement with the annular depression or recess 63, by means of a coiled wire spring 70 which surrounds the longitudinally movable rod 66, one end of the said spring abutting against the projecting lug 67, and the other end thereof abutting against a cover plate 71 secured to the collar 69.

The longitudinally movable rod 66 passes through an opening 72 in the said cover plate. The outer end of the longitudinally movable rod 66 is connected to the outer free end of the lever 57, as is clearly indicated in the drawings, the said lever 57 being held in engagement with the movable rod 66 by means of a nut 75 secured to the outer end of the longitudinally movable rod 66.

80 designates a vertical lever pivoted at its lower end to the frame of the machine and provided intermediate its ends with a cam roll 81 which is adapted to engage the cam groove 60 in the cam disk 59. The upper end of the said lever is connected to one end of a link 82, the other end of the said link 82 being connected to a crank arm 84 upon the valve 43. When the crank arm 84 is in the dotted line position shown in Figure VII, the perforations through the receptacle 40 are open, and when the said arm is in the dash line position shown in said figure, the said perforations are closed.

85 designates a support for receiving and guiding the pans as they are discharged from the greasing and cleansing machine.

In the operation of the machine as illustrated, it will be understood that baking pans are carried upon the conveying sprocket chains 10 underneath the cleansing brush 20 and above the pressure roll 26, the said cleansing brush being rotated in a direction opposite to that of the movement of the baking pans and of the carrying sprocket chains upon which they are supported, such rotation removing such particles from the pans as may have stuck to them in the baking process and permitting the said particles to be withdrawn through the exhaust flue or pipe 36.

As the pans pass between the cleansing brush 20 and the pressure roller 26, they engage the rollers 51 and occasion an outward movement of the said rollers and their supporting levers 52. By means of the rod or bar 55 connected to the said supporting levers 52 and the link 56 connected to the rod or bar 55 and the lever 57, outward movement of the latter is occasioned. Outward movement of the said lever 57 occasions an outward longitudinal movement of the rod 66, which movement of the said rod carries the projecting lug 67 out of alinement with the annular depression or recess 63 and into the elongated notch 64 formed on one side of the depression or recess 63. Such outward movement of the rod 66 connects the cam-disk 59 and the shaft 7 upon which it is mounted, so as to occasion its rotation therewith.

The shape and arrangement of the cam groove 60 which is provided in the cam disk 59 is such that at the moment a pan passes from underneath the grease holding receptacle 40, and beyond the forward one of the rollers 51, the eccentric or highest portion of the cam groove is in substantially the same horizontal plane as that of the shaft upon which the cam disk 59 is mounted, in which position the upper end of the lever 80 is in its rearmost position, and in which position the valve for closing the passageways from the receptacle 40 is closed, the crank arm being at that time in the dash line position indicated in Figure VII.

If no other pan is immediately following the pan which is discharged from the machine, the lever 57 and the longitudinally movable rod 66 move inwardly so as to carry the projecting lug 67 out of the notch 64 into alinement with the annular depression 63, thus disconnecting the cam disk 59 from the shaft 7, so that the said disk remains in the position last referred to with the valve closed.

If, however, a pan is immediately following a discharged pan, for instance as indicated in Figures I and II of the drawings, the cam disk would continue its rotation with the shaft 7, but the interval during which the cam roller 81 is passing around the high or eccentric portion of the cam groove to the low or concentric portion thereof, and during which time the valve 43 is closed, permits the forward end of the pan following or succeeding the discharged pan to travel under the said grease holding receptacle.

Assuming that the cam disk is stationary in the position above indicated, in which the high or eccentric portion of the cam groove 60 is in substantially the same horizontal plane as that of the axis of rotation of the cam disk, and assuming that the projecting lug 67 is in alinement with the annular depression 63, a pan placed upon the conveying chains will be carried forward and when it comes into contact or engagement with the first one of the rollers 51 will occasion movement of the lever 57 and consequently also movement of the longitudinally movable rod 66 to carry the projecting lug 67 into the elongated notch 64.

By reason of the lost motion between the cam disk 59 and the shaft 7 upon which it is mounted, which lost motion is occasioned by the elongated slot 64, and by reason of the fact that the cam roller 81 must travel a certain distance in the cam groove 60 before the valve 43 is opened, the pan will have traveled a distance slightly less than the distance between the said rollers 51 and will have reached a position in which its forward edge is underneath the grease holding receptacle, at the time of the opening of the said valve. It will thus be seen that the valve is open only when a pan is underneath the grease holding receptacle 40.

We do not wish to be understood as limiting ourselves to the exact construction shown herein, as it is obvious that various changes in construction may be made without departing from the spirit of our invention.

Having thus described our invention, we claim—

1. In a machine of the character described, the combination of means for conveying baking or other pans through the said machine, means for cleansing the said pans, a receptacle for containing grease in proximity to which the said pans are adapted to travel, the said receptacle being provided with passageways for the escape of said grease, means for opening and closing the said passageways, and mechanism for occasioning movement of the said means to open and close the said passageways, the said mechanism being controlled by the pans as they pass through the said machine.

2. In a machine of the character described, the combination of means for conveying baking or other pans through the said machine, means for cleansing the said pans, and means for applying grease to the said pans, the operation of the said greasing means being controlled by the pans as they pass through the said machine.

3. In a machine of the character described, the combination of means for conveying baking or other pans through the said machine, a cleansing brush extending across the path of travel and adapted to contact with the said pans, an exhaust pipe having an enlarged end within which the said cleansing brush is located, the particles removed from the pans by the cleansing brush being withdrawn through the said exhaust pipe.

4. In a machine of the character described, the combination of means for conveying baking or other pans through the said machine, a rotatable cleansing brush extending across the path of travel and adapted to contact with the said pans, an exhaust pipe having an enlarged end within which the said cleansing brush is located, the particles removed from the pans by the cleansing brush being withdrawn through the said exhaust pipe.

5. In a machine of the character described, the combination of means for conveying baking or other pans through the said machine, an exhaust pipe having an enlarged end underneath which the said pans are adapted to travel, a cleansing brush located in the enlarged end of the said exhaust pipe and adapted to contact with the surface of the said pan to cleanse the same, a grease holding receptacle underneath which the pans are adapted to travel after they have been cleansed, the said receptacle being provided with openings in its bottom for the passage of grease from the said receptacle, and means for opening and closing the said openings, the said means being controlled by the pans as they pass underneath the said receptacle.

6. In a machine of the character described, the combination of means for conveying baking or other pans through the said machine, a cleansing brush extending across the path of travel of and adapted to contact with the said pans, an exhaust pipe having an enlarged end located over the said cleansing brush, and means located in proximity to the said brush for directing a blast of air against the said pans to assist in cleansing them and also to assist in forcing the particles which have been removed from the pans through the said exhaust pipe.

7. In a machine of the character described, the combination of means for conveying baking or other pans through the said machine, a cleansing brush extending across the path of travel of and adapted to contact with the said pans, and means located in proximity to the said cleasing brush for directing a blast of air against the said pans.

8. In a machine of the character described, the combination of means for conveying baking or other pans through the said machine, a cleansing brush extending across the path of travel of and adapted to contact with the said pans, means located in proximity to the said cleansing brush for directing a blast of air against the said pans, and means for applying grease to the said pans.

9. In a machine of the character described, the combination of means for conveying baking or other pans through the said machine, a cleansing brush extending across the path of travel of and adapted to contact with the said pans, means located in proximity to the said cleansing brush for directing a blast of air against the said pans, and means for applying grease to the said pans, the operation of the said means being controlled by the pans as they pass through the said machine.

10. In a machine of the character described, the combination of means for conveying baking or other pans through the said machine, a cleansing brush for the said pans, an exhaust pipe having an enlarged end within which the said brush is located, means located within the said enlarged end and in proximity to the said brush for directing a blast of air against the said pans, a grease holding receptacle in proximity to which the said pans are adapted to travel, the said receptacle being provided with openings for the passage of said grease, means for opening and closing the said openings, and mechanism for occasioning movement of the said means to open and close the said openings, a part of the said mechanism being adapted to contact with the pans as they pass through the said machine whereby the escape of the grease from the said receptacle is controlled by the pans.

11. In a machine of the character described, the combination of means for conveying baking or other pans through the said machine, a grease holding receptacle in proximity to which the said pans are adapted to travel, the said receptacle being provided with a series of openings through which the grease contained in the said receptacle is adapted to pass, a valve for opening and closing the said openings, and means interposed between the said valve and the path of travel of the said pans for occasioning the opening and the closing of the said valve, the operation of the said means being controlled by the said pans.

12. In a machine of the character described, the combination of traveling conveyers for conveying baking or other pans through the said machine, movable means adapted to contact with and to be moved by the pans as they travel through the said machine, a grease holding receptacle underneath which the pans are adapted to travel, the said receptacle being provided with openings through its bottom through which grease is adapted to escape from the said receptacle, a valve for opening and closing the said openings, and means controlled by the movement of the said movable means for occasioning the movement of the said valve to open and close the said openings.

13. In a machine of the character described, the combination of conveyers for conveying baking or other pans through the said machine, movable members adapted to contact with one of the edges of the said pans as they travel through the machine, the said members being respectively mounted upon pivotal levers, a pivotal lever connected to said pivotal levers, a grease holding receptacle underneath which the said pans are adapted to travel, the said receptacle being provided with openings for the escape of grease from the said receptacle, a valve for opening and closing the said openings, a cam for occasioning movement of the said valve to open and close the said openings, and means for controlling the movement of the said cam, the said means being controlled by the last mentioned lever.

14. In a machine of the character described, the combination of a conveyer for conveying baking or other pans through the said machine, pivotally mounted means adapted to contact with and to be moved by one of the edges of the said pans as they travel through the said machine, a pivotally mounted lever having connection with the said pivotal means, a grease holding receptacle underneath which the said pans are adapted to travel, the said receptacle being provided with openings through which grease is adapted to escape from the said receptacle, a valve to open and close the said openings, a rotatable cam disk provided with a cam groove for opening and closing the said valve, means for occasioning the rotation of the said cam, the said means being controlled by the last mentioned lever, the said cam disk rotating and holding the said valve open during the time that a pan is passing underneath the said receptacle, and the said cam disk remaining stationary and holding the said valve closed when no pan is underneath the said receptacle.

15. In a machine of the character described, a conveyer for conveying baking or other pans through the said machine, movably supported means adapted to be engaged and moved by one of the edges of the said pans as they travel through the said machine, a grease holding receptacle underneath which the said pans are adapted to travel, the said receptacle being provided with openings through its bottom for the escape of the grease therefrom, a valve to open and close the said openings, and means interposed between the said valve and the said movable means for occasioning the movement of the said valve so as to open the same during the time that a pan is underneath the said receptacle, and to close the same when there is no pan underneath the receptacle.

16. In a machine of the character described, a conveyer for conveying baking or other pans through the said machine, movably suppported means adapted to be engaged and moved by one of the edges of the said pans as they travel through the said machine, a grease holding receptacle underneath which the said pans are adapted to travel, the said receptacle being provided with openings through its bottom for the escape of the grease therefrom, a valve to open and close the said openings, and means interposed between the said valve and the said movable means, the said interposed means including a cam disk provided with a cam groove and a series of levers, for occasioning the movement of the said valve so as to open the same during the time that a pan is underneath the said receptacle and to close the same when there is no pan underneath the receptacle.

17. In a machine of the character described, the combination of shafts located respectively at the opposite ends of said machine, conveying means supported upon and driven by the said shafts, the said conveying means adapted to support and convey baking or other pans through the said machine, a grease holding receptacle underneath which the said pans are adapted to be conveyed, the said receptacle being provided with openings in its bottom for the passage of grease therefrom, a valve to open and close the said openings, a normally stationary cam mounted upon one of the said shafts, the said cam when stationary holding the said valve in position to close the said openings, and means controlled by the movement of the pans through the said machine to occasion rotation of the said cam to open the said valve during the time that a pan is underneath the said receptacle.

18. In a machine of the character described, the combination of shafts located respectively at the opposite ends of the said machine, conveying means supported upon and driven by the said shafts, a grease holding receptacle underneath which the said pans are adapted to travel openings in the bottom of the said receptacle, and valves to open and close the said openings, a crank arm connected to the said valve, a normally stationary cam disk provided with a cam groove, a pivoted lever having a projection intermediate its ends which is adapted to engage the said cam groove, a link connecting the free end of the said lever and the said valve crank, and means controlled by the movement of the pans through the said machine to connect the said cam disk to the shaft upon which it is mounted to occasion rotation of the said cam disk whereby opening and closing of the said valve is occasioned.

19. In a machine of the character described, the combination of means for conveying baking or other pans through the said machine, a cleansing device adapted to contact with the said pans, and means located in proximity to the said cleansing device for directing a blast of air against the said pans.

In testimony that we claim the foregoing as our invention we have hereunto signed our names this 18th day of February, A. D. 1904.

GEORGE H. CLIFF.
    CHARLES H. W. CLIFF.

In presence of—
  Thos. K. Lancaster,
  Laura Kleinfelder.